United States Patent
McGrath

(10) Patent No.: US 10,386,857 B2
(45) Date of Patent: Aug. 20, 2019

(54) SENSOR-CENTRIC PATH PLANNING AND CONTROL FOR ROBOTIC VEHICLES

(71) Applicant: QUALCOMM Incorporated, San Diego, CA (US)

(72) Inventor: Gary McGrath, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 15/641,735

(22) Filed: Jul. 5, 2017

(65) Prior Publication Data
US 2019/0011932 A1    Jan. 10, 2019

(51) Int. Cl.
| G05D 1/08 | (2006.01) |
|---|---|
| G01C 23/00 | (2006.01) |
| B64G 1/24 | (2006.01) |
| B64C 39/02 | (2006.01) |
| G05D 1/00 | (2006.01) |
| B64D 47/08 | (2006.01) |

(52) U.S. Cl.
CPC ......... *G05D 1/0808* (2013.01); *B64C 39/024* (2013.01); *B64D 47/08* (2013.01); *B64G 1/244* (2019.05); *G01C 23/00* (2013.01); *G05D 1/0094* (2013.01); *G05D 1/0875* (2013.01); *G05D 1/0891* (2013.01); *B64C 2201/027* (2013.01); *B64C 2201/042* (2013.01); *B64C 2201/108* (2013.01); *B64C 2201/127* (2013.01); *B64C 2201/141* (2013.01)

(58) Field of Classification Search
None
See application file for complete search history.

(56) References Cited

U.S. PATENT DOCUMENTS

| 7,149,611 | B2 | 12/2006 | Beck et al. | |
|---|---|---|---|---|
| 9,296,496 | B2 | 3/2016 | Bullard et al. | |
| 9,501,061 | B2 | 11/2016 | Canoy et al. | |
| 9,550,561 | B1 | 1/2017 | Beckman et al. | |
| 9,574,703 | B2 | 2/2017 | Firchau et al. | |
| 10,171,796 | B2 * | 1/2019 | Sekiguchi | H04N 13/239 |
| 2003/0216834 | A1 * | 11/2003 | Allard | B25J 9/1689 |
| | | | | 700/245 |
| 2004/0101161 | A1 * | 5/2004 | Roh | G05D 1/0246 |
| | | | | 382/103 |
| 2006/0013469 | A1 * | 1/2006 | Wang | B25J 5/007 |
| | | | | 382/153 |

(Continued)

OTHER PUBLICATIONS

International Search Report and Written Opinion—PCT/US2018/029360—ISA/EPO—dated Jul. 9, 2018. 14 pages.

*Primary Examiner* — Rami Khatib
(74) *Attorney, Agent, or Firm* — The Marbury Law Group, PLLC

(57) ABSTRACT

Various embodiments involve controlling rotational maneuvers of a robotic vehicle (e.g., an unmanned aerial vehicle or UAV) so that commanded changes in vehicle attitude (e.g., pitch, roll, and/or yaw) may be performed as rotations about a center of sensing of a sensor instead of the vehicle's center of gravity. Maneuvers performed according to various embodiments may reduce or eliminate translational movements in the sensor output that occur when the robotic vehicle rotates about the center of gravity and the sensor is mounted some distance from the center of gravity.

25 Claims, 10 Drawing Sheets

(56) References Cited

U.S. PATENT DOCUMENTS

| | | | |
|---|---|---|---|
| 2009/0005906 A1* | 1/2009 | Tajima | B62D 57/032 700/245 |
| 2010/0138079 A1 | 6/2010 | Oegren | |
| 2010/0228406 A1 | 9/2010 | Hamke et al. | |
| 2017/0010611 A1 | 1/2017 | Tao et al. | |

* cited by examiner

SENSOR-CENTRIC PATH PLANNING AND CONTROL FOR ROBOTIC VEHICLES

BACKGROUND

Robotic vehicles (sometimes referred to as "drones") are increasingly being used in various consumer and commercial applications. For example, an unmanned aerial vehicle (UAV) may be equipped with various sensors, such as cameras, whose output may be sensitive to rotational maneuvers of the robotic vehicle during flight (e.g., pitch, roll, and yaw). To compensate for UAV rotations in sensor output, a mechanical or digital gimbal may be used so that the sensor can point in a given direction independent of the orientation or rotations of the UAV. A mechanical gimbal may physically adjust the orientation of a camera by an amount that compensates for UAV rotations. Alternatively, a digital gimbal that uses a wide field-of-view lens to capture video may enable digital selection of a portion of the captured video compensates for UAV rotations.

Robotic vehicle control systems, particularly UAV control systems, are typically egocentric around the center of gravity. Therefore, UAV rotations are generally centered around the UAV's center of gravity. When the camera is positioned at the UAV's center of gravity, a gimbal can adjust the camera orientation and/or video output to compensate for the rotational movement, thereby effectively removing any jitter or other movement from the video output. However, cameras mounted on gimbals are generally positioned to one side of the UAV's center of gravity (e.g., up, down, left or right). Consequently, the gimbal cannot compensate for translational movements (i.e., vertical, horizontal, or both) of the camera that occur during rotations due to the distance between the camera and the UAV's center of gravity. Thus, the output of a camera (or other sensor) mounted on a gimble some distance from the center of gravity of a UAV will suffer movement or jitter during UAV maneuvers despite compensating rotations of the gimbal.

SUMMARY

Various embodiments are disclosed for controlling rotational maneuvers of a robotic vehicle, so that commanded changes in vehicle attitude (e.g., pitch, roll, and/or yaw) may be performed as rotations about a center of sensing of a sensor (e.g., the sensor's location or sensing plane, such as the image plane or focal plane of a camera) instead of the vehicle's center of gravity. Maneuvers performed according to various embodiments may reduce or eliminate translational movements in the sensor output that may occur when the robotic vehicle rotates about the center of gravity and the sensor is mounted some distance from the center of gravity.

Various embodiments may include a processor of a robotic vehicle determining a rotational maneuver to perform about an axis at the center of gravity of the robotic vehicle (e.g., pitch, roll, yaw, or any combination thereof), determining an anticipated translational movement of a center of sensing of a sensor positioned away from a center of gravity of the robotic vehicle based on the rotational maneuver and a distance between the center of gravity of the robotic vehicle and the center of sensing, and controlling the robotic vehicle to perform a rotational maneuver such that the robotic vehicle rotates about the center of sensing of the sensor.

In some embodiments, determining the anticipated translational movement of the center of sensing of the sensor may include determining an anticipated vertical movement and/or an anticipated horizontal movement of the center of sensing based on the rotational maneuver and the distance between the center of gravity of the robotic vehicle and the center of sensing.

In some embodiments, controlling the robotic vehicle to perform the rotational maneuver such that the robotic vehicle rotates about the center of sensing of the sensor may include controlling the robotic vehicle to perform the rotational maneuver such that the center of gravity of the robotic vehicle traverses a path that offsets the anticipated vertical movement and/or the anticipated horizontal movement of the center of sensing. In some embodiments, controlling the robotic vehicle to perform a rotational maneuver such that the robotic vehicle rotates about the center of sensing of the sensor may include controlling the robotic vehicle's rotors to cause the robotic vehicle to perform the rotational maneuver about the axis at the center of sensing.

In some embodiments, determining the rotational maneuver to perform about the axis at the center of gravity of the robotic vehicle may include obtaining data defining a navigation path for the robotic vehicle and determining the rotational maneuver to perform about the axis at the center of gravity of the robotic vehicle based on data defining the navigation path.

Further embodiments include a robotic vehicle and/or a computing device within a robotic vehicle including a processor configured with processor-executable instructions to perform operations of the embodiment methods summarized above. In some embodiments, the robotic vehicle may be an aerial vehicle, a terrestrial vehicle, a space-based vehicle, or an aquatic vehicle. Further embodiments include a processing device (e.g., a system-on-chip (SoC)) including a processor configured with processor-executable instructions to perform operations of the embodiment methods summarized above. Further embodiments include a robotic vehicle and/or a computing device within a robotic vehicle including means for performing functions of the embodiment methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1A:
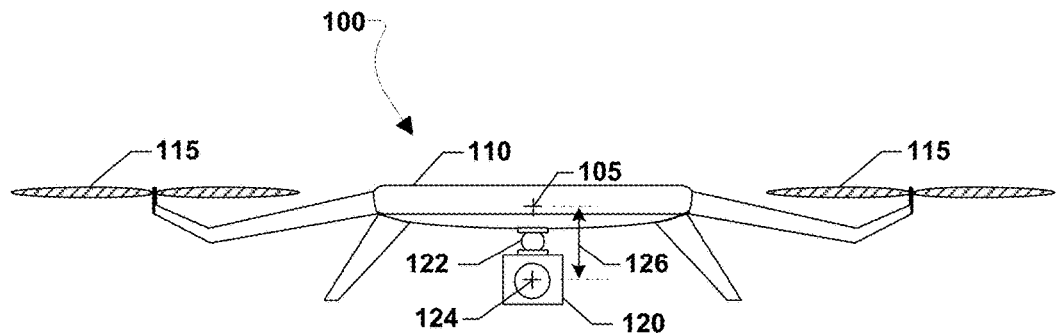
FIGS. 1A and 1B illustrate front elevation and plan views, respectively, of a UAV equipped with a sensor according to some embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and systems that control how robotic vehicle maneuvers are performed so that changes in vehicle attitude (e.g., pitch, roll, and/or yaw) happen as rotations about a center of sensing of a sensor (e.g., the focal plane of a camera) instead of the vehicle's center of gravity. Maneuvers performed according to various embodiments reduce or eliminate translational movements in the sensor output that occur when the robotic vehicle rotates about the center of gravity and the sensor is mounted on a gimbal some distance from the center of gravity. In various embodiments, rotational maneuvers may include a vertical and/or horizontal adjustment to the robotic vehicle's center of gravity in conjunction with the rotation, so that the sensor's center of sensing remains in essentially the same location during the maneuver. For example, in some embodiments, an aerial robotic vehicle controller may induce a pitch by increasing (or decreasing) the speed of rotors removed from the camera/sensor while maintaining the speed of rotors near to the sensor to change the tilt of the UAV while adjusting the altitude of the center of gravity so that the altitude of the center of sensing does not change. Various embodiments enable a gimbal to adjust the pointing angle of the camera/sensor so that the pointing direction does not change during the maneuver. In some embodiments, a flight path or trajectory of a UAV may be determined or planned about the center of sensing of a camera (vs. the UAV's center of gravity) so that a smooth video may be obtained during the planned flight or trajectory.

As used herein, the term "robotic vehicle" refers to one of various types of vehicles including an onboard computing device configured to provide some autonomous or semi-autonomous capabilities. Examples of robotic vehicles include but are not limited to: aerial vehicles, such as an unmanned aerial vehicle (UAV); ground vehicles (e.g., an autonomous or semi-autonomous car, a vacuum robot, etc.); water-based vehicles (i.e., vehicles configured for operation on the surface of the water or under water); space-based vehicles (e.g., a spacecraft or space probe); and/or some combination thereof. In some embodiments, the robotic vehicle may be manned. In other embodiments, the robotic vehicle may be unmanned. In embodiments in which the robotic vehicle is autonomous, the robotic vehicle may include an onboard computing device configured to maneuver and/or navigate the robotic vehicle without remote operating instructions (i.e., autonomously), such as from a human operator (e.g., via a remote computing device). In embodiments in which the robotic vehicle is semi-autonomous, the robotic vehicle may include an onboard computing device configured to receive some information or instructions, such as from a human operator (e.g., via a remote computing device), and autonomously maneuver and/or navigate the robotic vehicle consistent with the received information or instructions. In some implementations, the robotic vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic vehicle. Specific non-limiting examples of rotorcraft include tricopters (three rotors), quadcopters (four rotors), hexacopters (six rotors), and octocopters (eight rotors). However, a rotorcraft may include any number of rotors.

As used herein, the terms "unmanned aerial vehicle" or "UAV" refer to one of various types of aerial robotic vehicles that are capable of performing a rotational maneuver (e.g., pitch, roll, or yaw). An aerial robotic vehicle or UAV may be propelled for movement in any of a number of known ways. Although various embodiments of robotic vehicles are illustrated and described with reference to aerial robotic vehicle or UAVs, various embodiments are not limited to aerial robotic vehicles and may be implemented in any type of mobile robotic or autonomous vehicle (e.g., ground or aquatic vehicles). Thus, references to aerial robotic vehicles and UAVs in descriptions of various embodiments are not intended to limit the scope of the claims to aerial robotic vehicles.

The term "computing device" is used herein to refer to an electronic device equipped with at least a processor. Examples of computing devices may include navigation control and/or mission management computers, mobile devices (e.g., cellular telephones, wearable devices, smartphones, web-pads, tablet computers, Internet enabled cellular telephones, Wi-Fi® enabled electronic devices, personal data assistants (PDA's), laptop computers, etc.), personal computers, and server computing devices. In various embodiments, computing devices may be configured with memory and/or storage as well as networking capabilities, such as network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi® router, etc.).

Figure 1B:
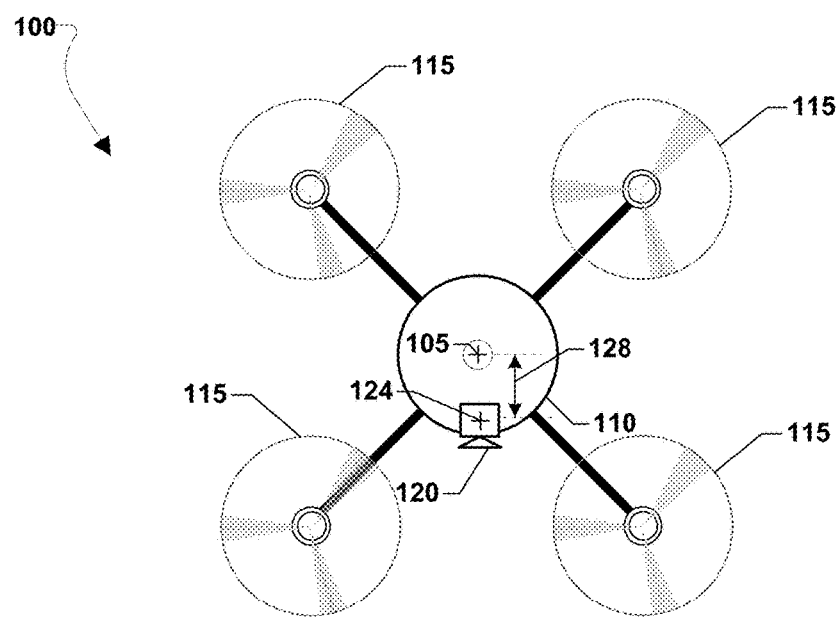

FIGS. 1A and 1B illustrate front elevation and plan views, respectively, of robotic vehicle 100 in the form of an aerial robotic vehicle or UAV equipped with a sensor 120 according to some embodiments. With reference to FIGS. 1A and 1B, in some embodiments, the sensor 120 may be any type of sensor that is capable of perceiving an environment within a limited field of view. For example, the sensor 120 may include a camera, image sensor, radar sensor, sonar sensor, ultrasound sensor, depth sensor, active sensors, passive sensors, or any combination thereof. Different types of sensors (i.e., sensors using different technologies) typically have different fields of view in terms of viewing angle and/or range sensitivities.

The sensor 120 may be attached to gimbal 122 (not visible in FIG. 1B) that is attached to a main housing or frame 110 of the robotic vehicle 100. In some embodiments, the sensor 120 and gimbal 122 may be integrated into the main housing 110 of the robotic vehicle 100, such that the sensor 120 is exposed through an opening in the main housing 110. In many cases, the sensor 120, and thus the center of sensing, may be located at a position offset from the robotic vehicle's center of gravity 105 (e.g., up, down, left, and/or right). For example, in the illustrated examples, the center of sensing 124 is offset from the robotic vehicle center of gravity 105 by a vertical distance 126 and a horizontal distance 128.

The robotic vehicle 100 may be propelled for flight in any of a number of known ways. For example, two or more propulsion units, each including one or more rotors 115, may provide propulsion or lifting forces for the robotic vehicle 100 and any payload carried by the robotic vehicle 100. Although the robotic vehicle 100 is illustrated as a quad copter with four rotors, an aerial robotic vehicle 100 may include more or fewer than four rotors 115. In some embodiments, the UAV 100 may include wheels, tank-treads, or other non-aerial movement mechanisms to enable movement on the ground, on or in water, and combinations thereof. The robotic vehicle 100 may be powered by one or more types of power source, such as electrical, chemical, electro-chemical, or other power reserve, which may power the propulsion units, the onboard computing device, and/or other onboard components. For ease of description and illustration, some detailed aspects of the robotic vehicle 100 are omitted, such as wiring, frame structure, power source, landing columns/gear, or other features that would be known to one of skill in the art.

Figure 2:
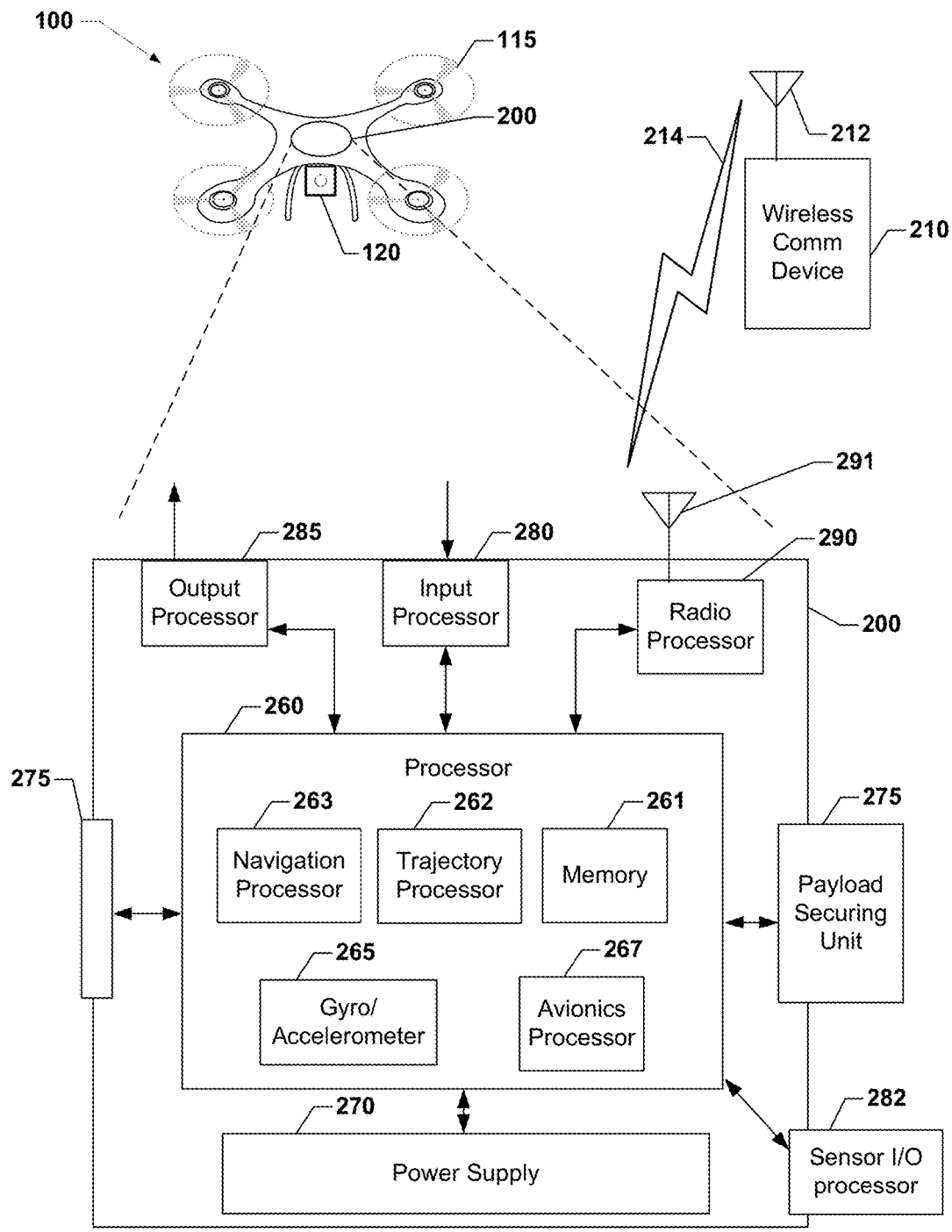
FIG. 2 illustrates components of a control unit of a UAV suitable for use in accordance with some embodiments.

FIG. 2 illustrates components of a control unit 200 of a robotic vehicle 100 suitable for use in various embodiments. With reference to FIGS. 1A-2, the control unit 200 may be configured to implement methods of controlling rotational maneuvers of the robotic vehicle to perform rotational movements of the robotic vehicle 100 about the center of sensing of a sensor 120. The control unit 200 may include various circuits and devices used to power and control the operation of the robotic vehicle 100. The control unit 200 may include a processor 260, a power supply 270, payload-securing units 275, an input processor 280, a sensor input/output (I/O) processor 282, an output processor 285, and a radio processor 290. The sensor I/O processor 282 may be coupled to a camera or other sensor 120. In some embodiments, the avionics processor 267 coupled to the processor 260 and/or the navigation unit 263 may be configured to provide travel control-related information such as altitude, attitude, airspeed, heading and similar information that the navigation processor 263 may use for navigation purposes, such as dead reckoning between GNSS position updates. The avionics processor 267 may include or receive data from the gyroscope/accelerometer 265 that provides data regarding the orientation and accelerations of the robotic vehicle 100 that may be used in navigation and positioning calculations.

In some embodiments, the processor 260 may be dedicated hardware specifically adapted to implement a method of controlling rotational maneuvers of the robotic vehicle to compensate for translational movements in the video or other sensor output of the sensor 120 on the robotic vehicle according to some embodiments. In some embodiments, the processor 260 may be a programmable processing unit programmed with processor-executable instructions to perform operations of the various embodiments. The processor 260 may also control other operations of the robotic vehicle, such as navigation, collision avoidance, data processing of sensor output, etc. In some embodiments, the processor 260 may be a programmable microprocessor, microcomputer or multiple processor chip or chips that can be configured by software instructions to perform a variety of functions of the robotic vehicle. In some embodiments, the processor 260 may be a combination of dedicated hardware and a programmable processing unit.

In some embodiments, the processor 260 may be coupled to the sensor I/O processor 282 to receive images or data output from an onboard camera or other sensor 120. In some embodiments, the processor 260 may be configured to process, manipulate, store, and/or retransmit the sensor output received via the sensor I/O processor 282 for a variety of applications, including but not limited to image/video recording, package delivery, collision avoidance, and path planning.

In some embodiments, the processor 260 may include or be coupled to memory 261, a trajectory processor 262, a navigation processor 263, a gyroscope/accelerometer 265, and/or an avionics processor 267. In some embodiments, the navigation processor 263 may include a global navigation satellite system (GNSS) receiver (e.g., one or more global positioning system (GPS) receivers) enabling the robotic vehicle 100 to navigate using GNSS signals. Alternatively or additionally, the navigation processor 263 may be equipped with radio navigation receivers for receiving navigation beacons or other signals from radio nodes, such as navigation beacons (e.g., very high frequency (VHF) omni directional range (VOR) beacons), Wi-Fi® access points, cellular network sites, radio station, remote computing devices, other robotic vehicle s, etc. In some embodiments, the processor 260 and/or the navigation processor 263 may be configured to communicate with a server or other wireless communication device 210 through a wireless connection (e.g., a cellular data network) to receive data useful in navigation, provide real-time position reports, and assess data.

In some embodiments, the processor 260 and/or the trajectory processor 262 may receive data from the navigation processor 263 and use such data in order to determine the present position and orientation of the robotic vehicle 100, as well as an appropriate course towards a destination or intermediate sites. In some embodiment, the avionics processor 267 coupled to the processor 260 and/or the navigation processor 263 may be configured to provide travel control-related information such as altitude, attitude, airspeed, heading and similar information that the trajectory processor 262 and/or the navigation processor 263 may use for navigation purposes, such as dead reckoning between GNSS position updates. In some embodiments, the avionics processor 267 may include or receive data from the gyroscope/accelerometer 265 that provides data regarding the orientation and accelerations of the robotic vehicle 100 that may be used in flight control calculations.

In some embodiments, the control unit 200 may be equipped with the input processor 280 and an output processor 285. For example, in some embodiments, the input processor 280 may receive commands or data from various external sources and route such commands or data to the processor 260 to configure and/or control one or more operations of the robotic vehicle 100. In some embodiments, the processor 260 may be coupled to the output processor 285 to output control signals for managing the motors that drive the rotors 115 and other components of the robotic vehicle 100. For example, the processor 260 may control the speed and/or direction of the individual motors of the rotors 115 to enable the robotic vehicle 100 to perform various rotational maneuvers, such as pitch, roll, and yaw.

In some embodiment, the radio processor 290 may be configured to receive navigation signals, such as signals from aviation navigation facilities, etc., and provide such signals to the processor 260 and/or the navigation processor 263 to assist in robotic vehicle navigation. In various embodiments, the navigation processor 263 may use signals received from recognizable radio frequency (RF) emitters (e.g., AM/FM radio stations, Wi-Fi® access points, and cellular network base stations) on the ground. The locations, unique identifiers, signal strengths, frequencies, and other characteristic information of such RF emitters may be stored in a database and used to determine position (e.g., via triangulation and/or trilateration) when RF signals are received by the radio processor 290. Such a database of RF emitters may be stored in the memory 261 of the robotic vehicle 100, in a ground-based server in communication with the processor 260 via a wireless communication link, or in a combination of the memory 261 and a ground-based server.

In some embodiment, the processor 260 may use the radio processor 290 to conduct wireless communications with a variety of wireless communication devices 210, such as a beacon, server, smartphone, tablet, or other computing device with which the robotic vehicle 100 may be in communication. A bi-directional wireless communication link (e.g., wireless signals 214) may be established between a transmit/receive antenna 291 of the radio processor 290 and a transmit/receive antenna 212 of the wireless communication device 210. In an example, the wireless communication device 210 may be a cellular network base station or cell tower. The radio processor 290 may be configured to support multiple connections with different wireless communication devices (e.g., wireless communication device 210) having different radio access technologies.

In some embodiments, the processor 260 may be coupled to one or more payload-securing units 275. The payload-securing units 275 may include an actuator motor that drives a gripping and release mechanism and related controls that are responsive to the control unit 200 to grip and release a payload package in response to commands from the control unit 200.

In some embodiments, the power supply 270 may include one or more batteries that may provide power to various components, including the processor 260, the payload-securing units 275, the input processor 280, the sensor I/O processor 282, the output processor 285, and the radio processor 290. In addition, the power supply 270 may include energy storage components, such as rechargeable batteries. In this way, the processor 260 may be configured with processor-executable instructions to control the charging of the power supply 270, such as by executing a charging control algorithm using a charge control circuit. Alternatively or additionally, the power supply 270 may be configured to manage its own charging.

While the various components of the control unit 200 are illustrated in FIG. 2 as separate components, some or all of the components (e.g., the processor 260, the output processor 285, the radio processor 290, and other units) may be integrated together in a single device or processor system, such as a system-on-chip.

Figure 3:
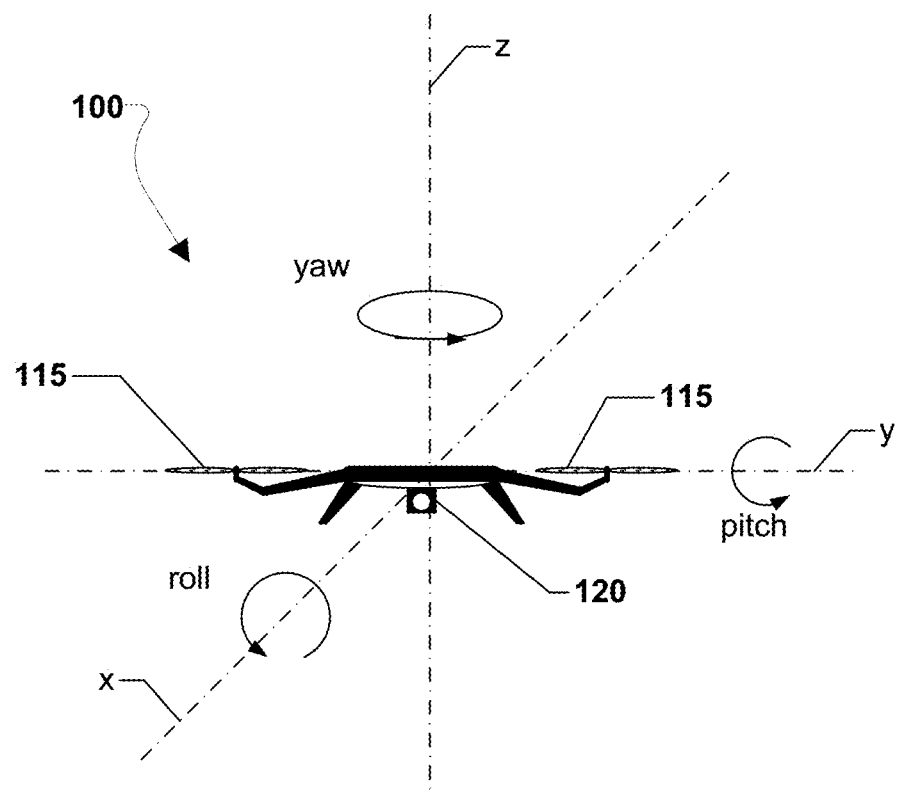
FIG. 3 illustrates a UAV performing various rotational maneuvers about the UAV's center of gravity.

FIG. 3 illustrates a robotic vehicle 100 in the form of an aerial robotic vehicle showing axes of rotation about the vehicle's center of gravity. With reference to FIGS. 1A-3, when a robotic vehicle 100 performs a rotational maneuver (e.g., pitch, roll, and/or yaw), the robotic vehicle 100 traditionally rotates about an axis that intersects with the robotic vehicle's center of gravity. For example, the robotic vehicle 100 may be represented in a coordinate space having three orthogonal axes x, y, and z that intersect at the robotic vehicle's center of gravity. The center of gravity may represent an average location of the weight of the robotic vehicle 100. In some embodiments, the center of gravity may be a predetermined location on the robotic vehicle that is based on the structural design and/or anticipated payload of the robotic vehicle 100. In some embodiments, the center of gravity of the robotic vehicle may be dynamically determined according to existing techniques.

The speed and/or direction of the individual rotors 115 of the robotic vehicle 100 may be controlled by the vehicle processor 260 to perform specific rotational maneuvers about the robotic vehicle's center of gravity. Traditionally, to make a quadcopter roll right (e.g., rotate about the roll axis x clockwise), for example, the two rotors on the left side of the quadcopter may be controlled to spin faster than the two rotors on the right side. This gives the left side of the quadcopter more lift than the right side, causing the quadcopter to tilt to the right about the roll axis x. To make a quadcopter pitch down (e.g., rotate about the pitch axis y clockwise), the two rotors on the back side of the quadcopter may be controlled to spin faster than the two rotors on the front side. This gives the back side of the quadcopter more lift than the front side, causing the quadcopter to tilt downward about the pitch axis y. To make a quadcopter yaw (e.g., rotate about the yaw axis z), a first pair of diametrically opposite rotors that spin in one direction may be controlled to spin slower than a second pair of diametrically opposite rotors that spin in the other direction, causing the quadcopter to rotate about the yaw axis clockwise (or counter-clockwise).

As described, cameras and other sensors 120 may be mounted on a robotic vehicle 100 to one side of the robotic vehicle's center of gravity (e.g., up, down, left or right). Thus, while a gimbal 122 may compensate for robotic vehicle rotations about the robotic vehicle's center of gravity 105, the gimbal 122 cannot compensate for translational movements of a sensor 120 resulting from such rotations when the camera 120 or other sensor, and thus the center of sensing 124, is positioned away from the robotic vehicle's center of gravity 105.

Figure 4:
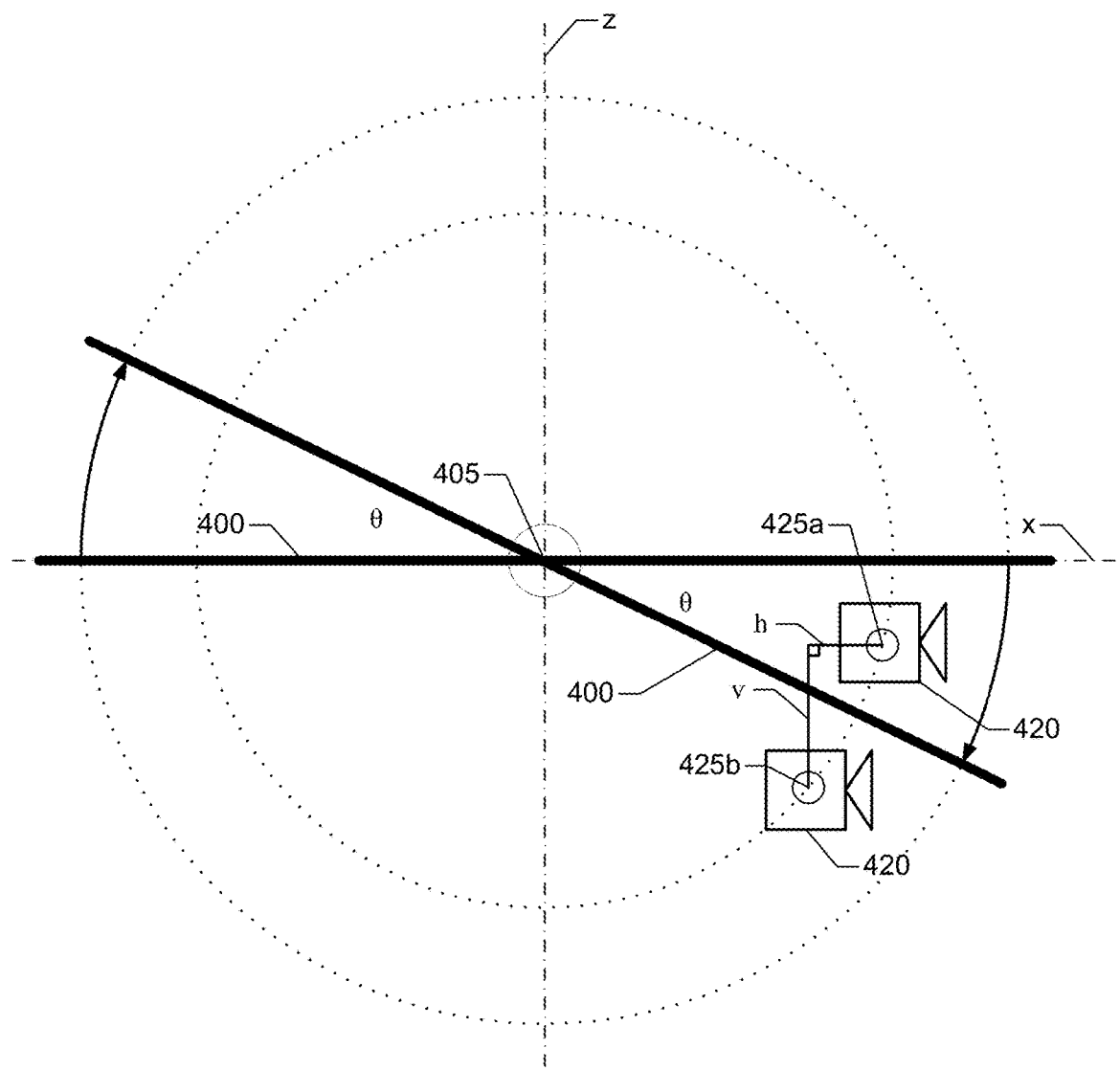
FIG. 4 illustrates a translational movement of a sensor in response to a rotational maneuver performed about the center of gravity of a UAV.

FIG. 4 illustrates a translational movement of a sensor 420 in response to a rotational maneuver performed about the center of gravity 405 of a robotic vehicle 100. With reference to FIGS. 1A-4, the robotic vehicle 100 may be equipped with a camera or other sensor 420 positioned away from the robotic vehicle's center of gravity 405. The center of sensing may be an image plane, a focal plane, or other sensing plane of the sensor 420. The location of the sensor 420 on the robotic vehicle 100 may be represented as a lever arm 400 that rotates about the center of gravity 405.

When the robotic vehicle 100 pitches downward about a pitch axis x at a rotation angle θ, the center of sensing of the sensor 420 is offset by a horizontal movement h and a vertical movement v from a first position 425a to a second position 425b. In some embodiments, the center of sensing may be a predetermined fixed location on the sensor 420. As a result of translational movements of the center of sensing from position 425a to 425b, translational movements are also induced in the output of the sensor 420. For example, where the sensor 420 is a camera, the video output may appear to be jittery due to the vertical v and horizontal h movements of the center of sensing even though a gimbal 122 compensates for rotational movements of the robotic vehicle 100. Translational movements (e.g., vertical, horizontal, or both) may also be induced in the sensor output in response to the robotic vehicle 100 performing a roll or yaw maneuver about the center of gravity.

In order to avoid translational movements in the sensor output, various embodiments may control the rotational maneuver of the robotic vehicle 100 to include a vertical and/or horizontal adjustment to the robotic vehicle's center of gravity 405, so that the center of sensing remains essentially in the same location or position (e.g., 425a). For example, in some embodiments, the center of sensing may remain in the same vertical plane, same horizontal plane, or both.

Figure 5:
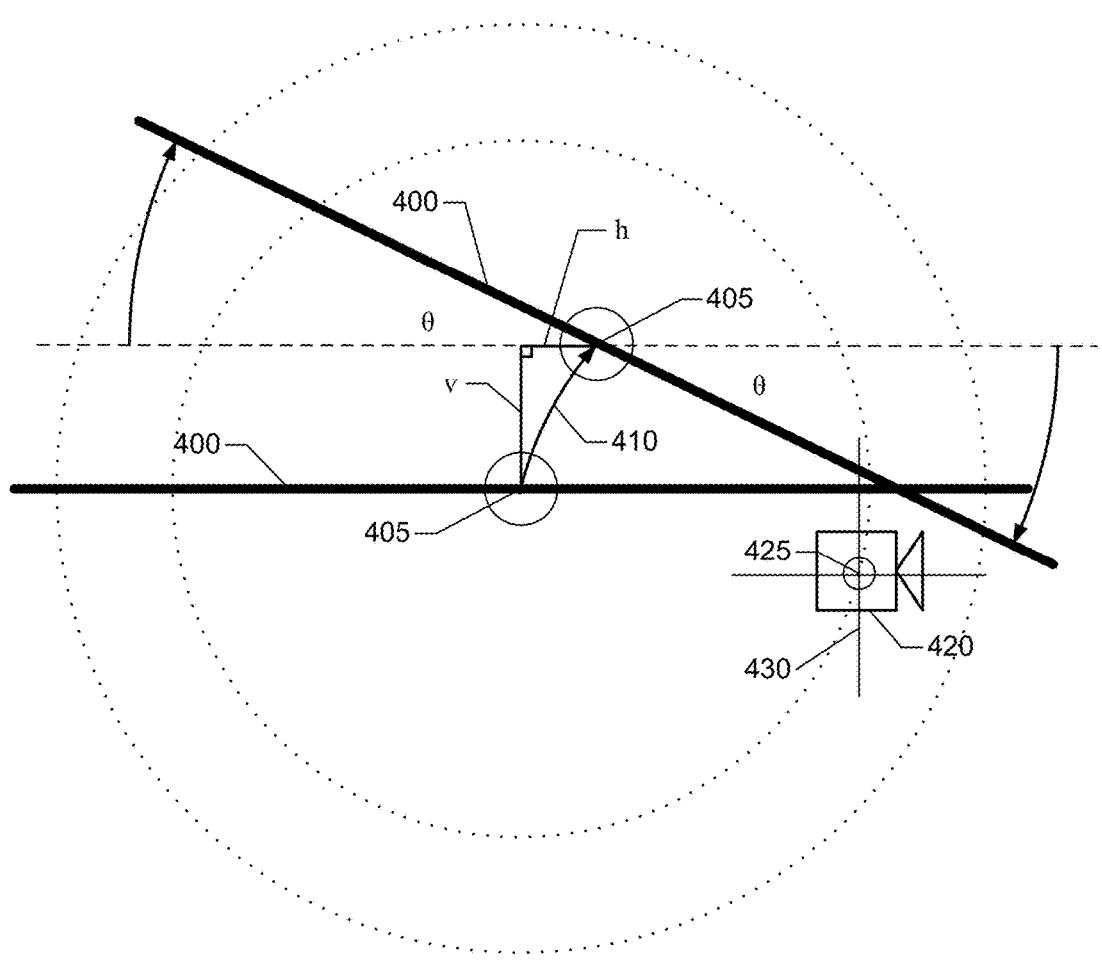
FIG. 5 illustrates a UAV performing a rotational movement such that the UAV rotates about an axis at the center of sensing of a sensor according to some embodiments.

FIG. 5 illustrates a robotic vehicle 100 performing a rotational movement such that the robotic vehicle 100 rotates about an axis 430 at the center of sensing 425 of a sensor 420 according to some embodiments. With reference to FIGS. 1A-5, the robotic vehicle 100 includes a camera 420 or other sensor positioned away from the robotic vehicle's center of gravity 405 represented as a lever arm 400. As the robotic vehicle 100 pitches downward towards the rotational angle θ, a control processor 200 also executes flight controls that cause the robotic vehicle's center of gravity 405 to traverse a path 410 that includes a vertical movement v and a horizontal movement h. As a result, the center of sensing 425 remains still.

Roll and yaw maneuvers may be performed in a similar manner such that the robotic vehicle's center of gravity 405 traverses a path that offsets for the movement of the sensor's center of sensing 425 that would otherwise occur if rotations occurred about the center of gravity 405. Such maneuvers may be accomplished by controlling the speed and/or direction of rotors 115 of the robotic vehicle. Thus, various embodiments involve controlling pitch, roll and/or yaw rotations of a robotic vehicle 100 about the center of sensing 425 of a sensor.

Figure 6:
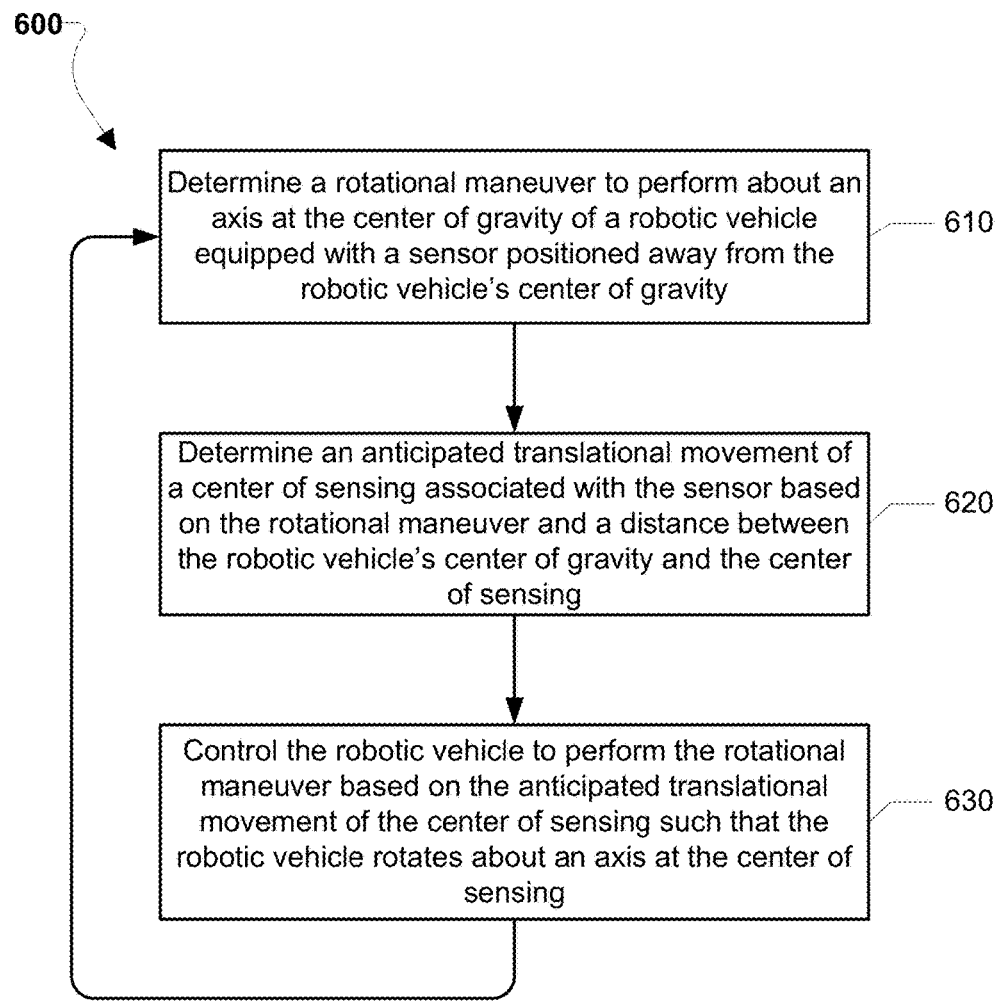
FIG. 6 illustrates a method of controlling rotational maneuvers of a UAV to enable maneuvers about an axis at the center of sensing of a sensor according to some embodiments.

FIG. 6 illustrates a method 600 of controlling rotational maneuvers of a robotic vehicle (e.g., 100, 400) to compensate for translational movements in sensor output according to some embodiments. With reference to FIGS. 1A-6, operations of the method 600 may be performed by a robotic vehicle's control unit (e.g., 200) or a processor (e.g., 260) within the control unit.

In block 610, the processor may determine a rotational maneuver to perform about an axis at the center of gravity of the robotic vehicle. The rotational maneuver may include pitching, rolling, yawing or a combination of thereof. In some embodiments, the rotational angle may be measured in radians, degrees, or other angular units. In some embodiments, the rotational maneuver may be determined dynamically, e.g., a maneuver determined to avoid a collision or in response to remote control signals. In some embodiments, the rotational maneuver may be determined from preconfigured or stored navigation/travel plans, e.g., a flight path or trajectory to a destination.

In block 620, the processor (e.g., 260) may determine an anticipated translational movement of a center of sensing associated with a sensor that would occur if the rotation is performed about the robotic vehicle's center of gravity. This determination may be based on the rotational maneuver determined in block 610 and the distance between the robotic vehicle's center of gravity and the center of sensing of the sensor. The determined anticipated translational movement of the center of sensing may include an anticipated vertical movement, an anticipated horizontal movement, or both.

Figure 7A:
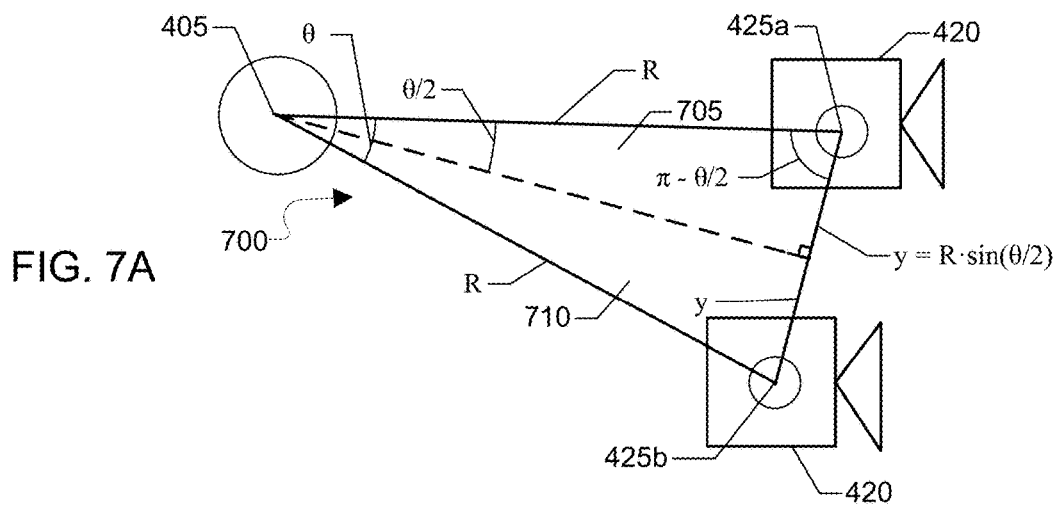
FIGS. 7A, 7B and 7C illustrate geometries for determining anticipated vertical and horizontal movements of the center of sensing based on rotational maneuvers according to some embodiments.
Figure 7B:
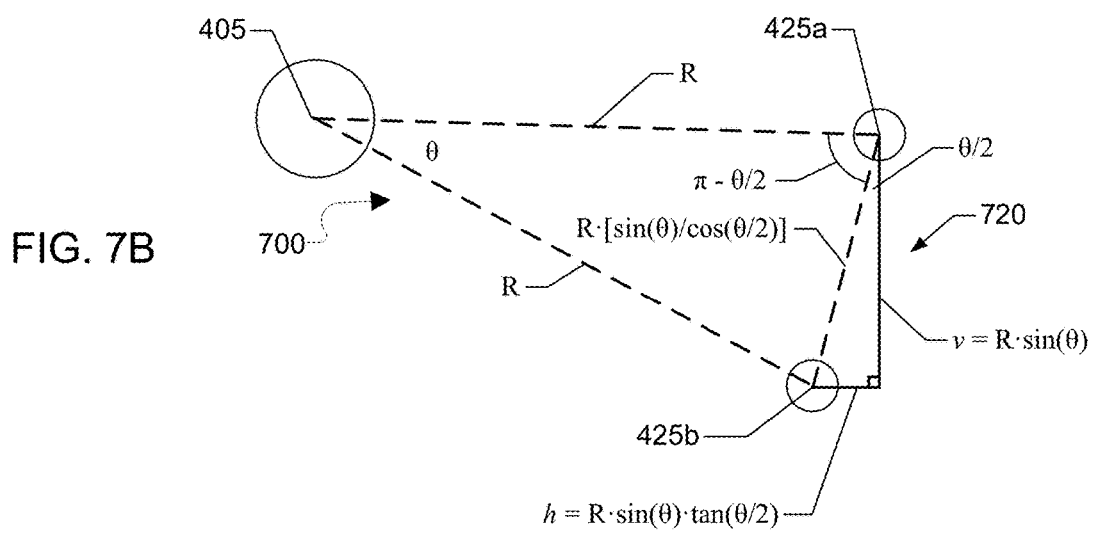
Figure 7C:
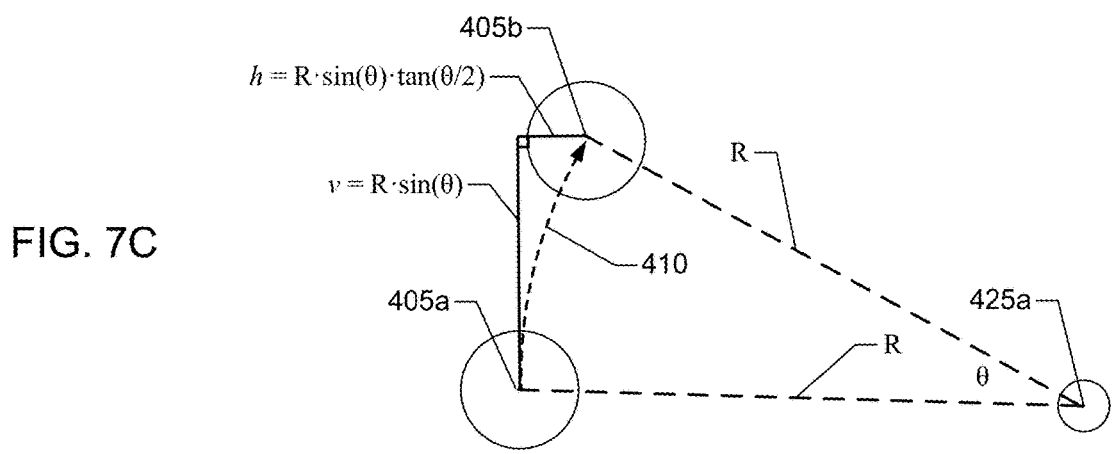

FIGS. 7A, 7B and 7C illustrate a manner of determining anticipated vertical and horizontal movements of the center of sensing based on a rotational maneuver that may be performed by the processor in block 620. With reference to FIGS. 1A-7B, in some embodiments, the processor may model the anticipated vertical and horizontal movements of the sensor's center of sensing from a starting position 425a to an ending position 425b as an isosceles triangle 700. For example, the isosceles triangle 700 may have an apex at the center of gravity 405 of angle θ and two equal legs of constant length R. The constant length R may be calculated once from the design of the robotic vehicle or may be calibrated within the processor using other data. The base of the isosceles triangle 700, which extends between the starting position 425a and ending position 425b of the center of sensing, form the hypotenuse of a right triangle 720 having legs that correspond to the anticipated vertical and horizontal movements v, h. Thus, in some embodiments, the processor may calculate anticipated values of the vertical and horizontal movements v, h of the center of sensing based on the base length of triangle 700, e.g., 2y, and the angle of rotation θ. For example, by splitting the isosceles triangle 700 into two right triangles 705, 710, the processor may calculate the base length of triangle 700 as equal to $2R*\sin(\theta/2)$ (i.e., 2y where $y=R*\sin(\theta/2)$) or an approximation thereof. Using the calculated base length 2y as the length of the hypotenuse of triangle 720 and an angle of θ/2, the processor may further calculate the anticipated vertical movement v as equal to $R*\sin(\theta)$ and the anticipated horizontal movement h as equal to $R*\sin(\theta)*\tan(\theta/2)$ or approximations thereof.

In some embodiments, the processor may determine only the anticipated vertical movement v associated with the rotational maneuver (e.g., pitch) or the anticipated horizontal movement h (e.g., yaw) in block 620. In some embodiments, the processor may determine both the anticipated vertical movement v and horizontal movement h associated with the rotational maneuver (e.g., roll) in block 630.

Returning to the method 600, in block 630, the processor may control the robotic vehicle to perform the rotational maneuver based on the anticipated translational movement of the center of sensing such that the robotic vehicle rotates about an axis at the center of sensing. For example, the processor may use the amount of rotation (e.g., rotation angle θ) determined in block 610 in conjunction with the anticipated translational movement of the center of sensing determined in block 620 (e.g., v, h, or both) to determine a flight path of the robotic vehicle's center of gravity, and control the robotic vehicle to execute that flight path. Thus, the processor may control the rotors 115 or other propulsion units of the robotic vehicle 100 to perform the rotational maneuver such that the center of gravity of the robotic vehicle traverses a path that offsets one or more of the anticipated vertical movement and the anticipated horizontal movement of the center of sensing determined in block 620.

In some embodiments, when the navigation processor (e.g., 263) may command a single axis rotation (e.g., pitch) as part of a larger path (e.g., forward movement along the x-axis), the processor may send the command signal to a trajectory processor (e.g., 262) that translates the commanded motion from the center-of-mass into the center-of-sensing. For example, in some embodiments, the trajectory processor may send several signals to the avionics processor (e.g., 267) for small motion changes. The net effect of the small steps may be to adjust the normal sequence of pitching forward and increasing the z-axis thrust, which moves the center of sensing from position 425a to position 425b as illustrated in FIG. 7B. The net adjustment uses the h and v values calculated previously to move the center of mass from position 405a to position 405b as illustrated in FIG. 7C so that the center of sensing at 425a does not translate but may rotate. Each small step (e.g., each dash of 410) may be determined using the same calculation but for the smaller angles of that arc segment. In some embodiments, the total angle needed may be divided uniformly while other embodiments may use nonlinear spacing. In some embodiments, the same or similar procedures may be used for independent roll and yaw motions.

The processor may again determine the next rotational maneuver in block 610 as the method 600 may be performed continuously or periodically so that most or all maneuvers by the robotic vehicle while executing a mission or transiting to a destination are performed so that rotations of the robotic vehicle occur about the axis at the center of sensing.

Figure 8:
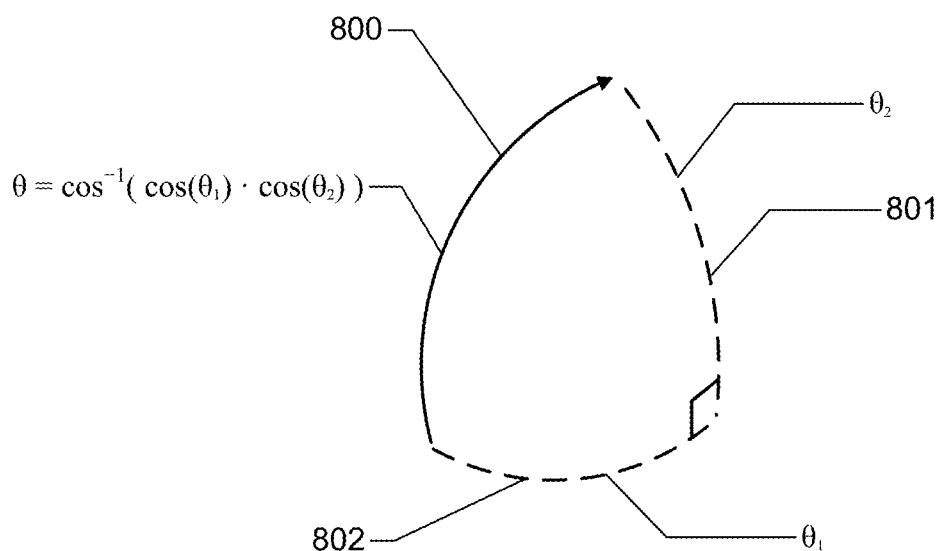
FIG. 8 illustrates geometries of UAV maneuvers about multiple axes for performing rotational movements about the center of sensing of a sensor according to some embodiments.

FIG. 8 illustrates geometries 800 involved in a robotic vehicle performing multiple rotational movements simultaneously about the center of sensing of a sensor according to some embodiments. With reference to FIGS. 1-8, when the navigation processor commands two rotations to be performed by the robotic vehicle together simultaneously, the same or similar calculations for the h and v values may be used to send signals to the avionics processor for the displacements along that rotation path. In some embodiments, the angles commanded from the navigation processor ($\theta_1$ and $\theta_2$) for a first rotation 801 and a second rotation 802 may be orthogonal angles (e.g., roll, pitch, and yaw). In some embodiments, the angle needed for the calculations of h and v values is then $\theta=\cos^{-1}(\cos(\theta_1)\cdot\cos(\theta_2))$.

In some embodiments, a processor may determine a path or trajectory of a robotic vehicle that coincides with the center of sensing of a camera as opposed to the robotic vehicle's center of gravity to enable a smooth video to be obtained from a camera 120 on a gimbal 122. As previously discussed, changes in attitude (e.g., roll, yaw, and pitch) are typically centered around the robotic vehicle's center of gravity, which can cause translational movements of a sensor located a distance from the robotic vehicle's center of gravity. Thus, in order to avoid translational movement in sensor output, the processor may determine an anticipated translational movement of a center of sensing associated with the sensor (e.g., 120, 420) based on the rotational maneuver and a distance between the robotic vehicle's center of gravity and the center of sensing (e.g., block 620) and control the robotic vehicle in performing the rotational maneuver based on the anticipated translational movement so that the robotic vehicle rotates about an axis at the center of sensing (e.g., 430).

Figure 9:
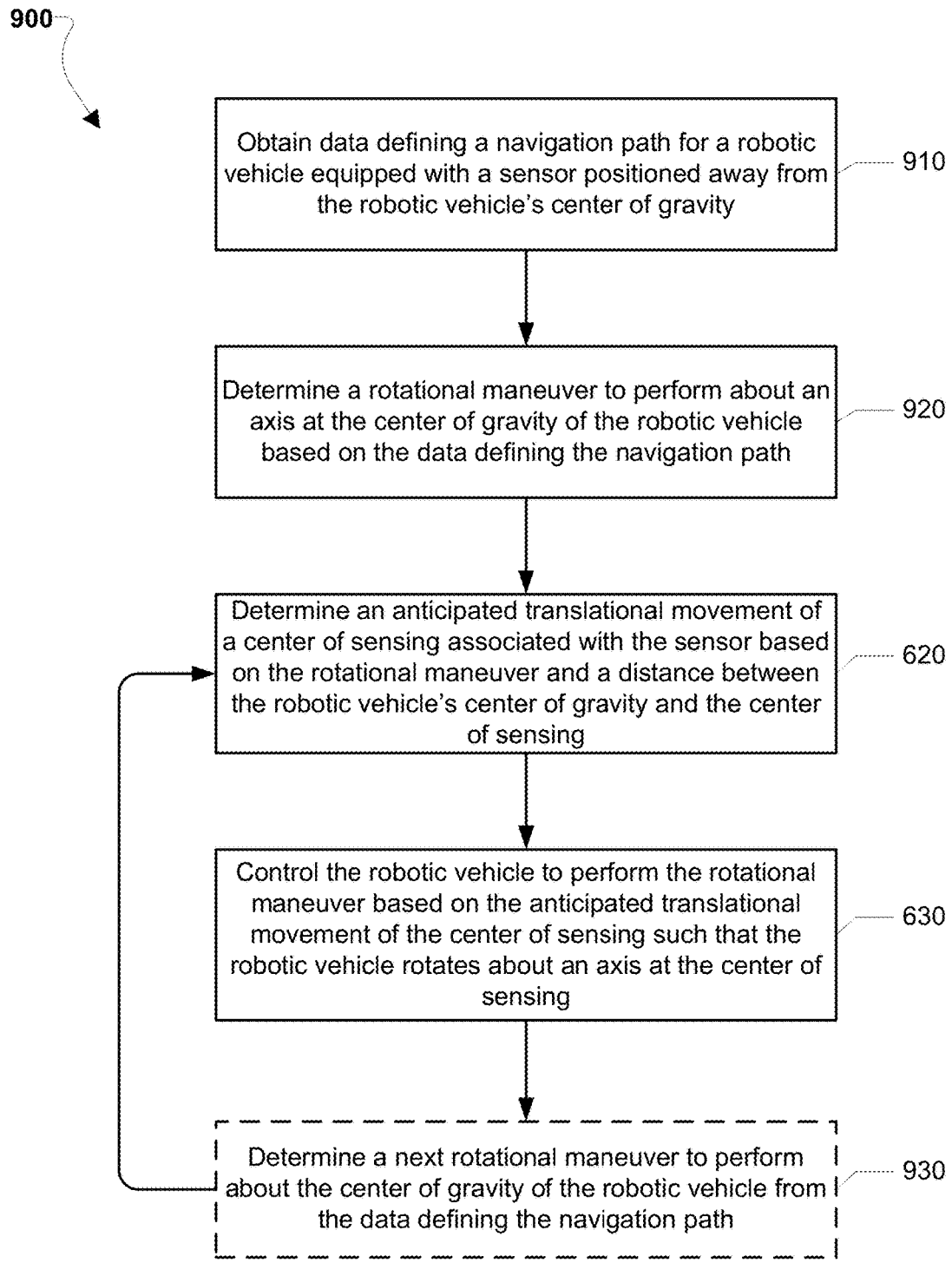
FIG. 9 illustrates a method of adjusting a planned path or trajectory of a UAV to perform rotational maneuvers about a center of sensing according to some embodiments.
Figure 10:
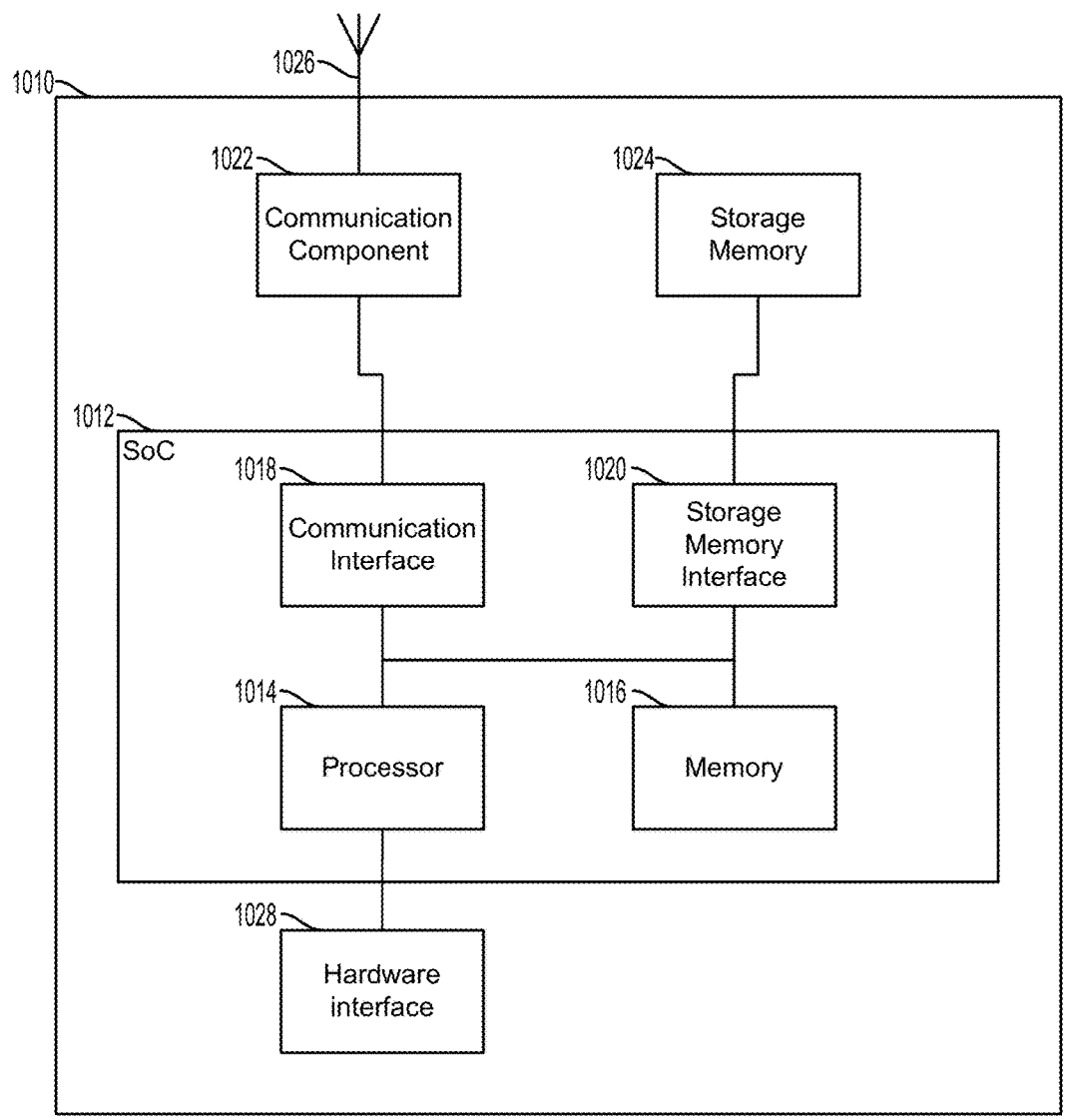
FIG. 10 is a component block diagram illustrating a processing device suitable for implementing various embodiments.

FIG. 9 illustrates a method 900 of adjusting a planned path or trajectory of a robotic vehicle (e.g., an aerial robotic vehicle or UAV) that performs rotational maneuvers about a center of sensing according to some embodiments. With reference to FIGS. 1A-9, operations of the method 900 may be performed by the robotic vehicle's control unit (e.g., 200), particularly a processor (e.g., 260) within the control unit. The method 900 may include operations in block 620 and 630 of the method 600 as described.

In block 910, the processor may obtain data defining a navigation path for a robotic vehicle (e.g., 100, 400) equipped with a sensor (e.g., 120, 420) positioned away from the robotic vehicle's center of gravity (e.g., 405). In some embodiments, the navigation data may define a series of location-based coordinates or waypoints (e.g., GPS coordinates, latitude/longitude/altitude coordinates, etc.) along a path to an intended destination.

In block 920, the processor (e.g., 260) may determine a rotational maneuver to perform about an axis at the center of gravity of the robotic vehicle based on data defining the navigation path. For example, in some embodiments, the processor may determine whether to perform a rotational maneuver in order to effect a change in direction or attitude of the robotic vehicle necessary to follow the navigation path.

In block 620, the processor (e.g., 260) may determine an anticipated translational movement of a center of sensing associated with a sensor that would occur if the rotation determined in block 920 is performed about the robotic vehicle's center of gravity. This determination may be based on the rotational maneuver determined in block 920 and the distance between the robotic vehicle's center of gravity and the center of sensing of the sensor. The determined anticipated translational movement of the center of sensing may include an anticipated vertical movement, an anticipated horizontal movement, or both.

In block 630, the processor may control the robotic vehicle to perform the rotational maneuver based on the anticipated translational movement of the center of sensing such that the robotic vehicle rotates about an axis at the center of sensing. For example, the processor may use the amount of rotation (e.g., rotation angle $\theta$) determined in block 920 in conjunction with the anticipated translational movement of the center of sensing determined in block 620 (e.g., v, h, or both) to determine a flight path of the robotic vehicle's center of gravity, and control the robotic vehicle to execute that flight path.

In optional block 930, the processor may determine a next rotational maneuver to perform about the center of gravity from the data defining the navigation path obtained in block 920. For example, in some embodiments, the processor may determine whether to perform a next rotational maneuver in order to effect a next change in direction or altitude of the robotic vehicle as indicated in the navigation path data.

Various embodiments may be implemented within a processing device 1010 configured to be used in a robotic vehicle. A processing device may be configured as or including a system-on-chip (SoC) 1012, an example of which is illustrated FIG. 10. With reference to FIGS. 1-10, the SoC 1012 may include (but is not limited to) a processor 1014, a memory 1016, a communication interface 1018, and a storage memory interface 1020. The processing device 1010 or the SoC 1012 may further include a communication component 1022, such as a wired or wireless modem, a storage memory 1024, an antenna 1026 for establishing a wireless communication link, and/or the like. The processing device 1010 or the SoC 1012 may further include a hardware interface 1028 configured to enable the processor 1014 to communicate with and control various components of a robotic vehicle. The processor 1014 may include any of a variety of processing devices, for example any number of processor cores.

The term "system-on-chip" (SoC) is used herein to refer to a set of interconnected electronic circuits typically, but not exclusively, including one or more processors (e.g., 1014), a memory (e.g., 1016), and a communication interface (e.g., 1018). The SoC 1012 may include a variety of different types of processors 1014 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SoC 1012 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 1012 may include one or more processors 1014. The processing device 1010 may include more than one SoC 1012, thereby increasing the number of processors 1014 and processor cores. The processing device 1010 may also include processors 1014 that are not associated with an SoC 1012 (i.e., external to the SoC 1012). Individual processors 1014 may be multicore processors. The processors 1014 may each be configured for specific purposes that may be the same as or different from other processors 1014 of the processing device 1010 or SoC 1012. One or more of the processors 1014 and processor cores of the same or different configurations may be grouped together. A group of processors 1014 or processor cores may be referred to as a multi-processor cluster.

The memory 1016 of the SoC 1012 may be a volatile or non-volatile memory configured for storing data and processor-executable instructions for access by the processor 1014. The processing device 1010 and/or SoC 1012 may include one or more memories 1016 configured for various purposes. One or more memories 1016 may include volatile memories such as random access memory (RAM) or main memory, or cache memory.

Some or all of the components of the processing device 1010 and the SoC 1012 may be arranged differently and/or combined while still serving the functions of the various aspects. The processing device 1010 and the SoC 1012 may not be limited to one of each of the components, and multiple instances of each component may be included in various configurations of the processing device 1010.

The various embodiments illustrated and described are provided merely as examples to illustrate various features of the claims. However, features shown and described with respect to any given embodiment are not necessarily limited to the associated embodiment and may be used or combined with other embodiments that are shown and described. In particular, various embodiments are not limited to use on aerial robotic vehicles and may be implemented on any form of robotic vehicle, including land vehicles, waterborne vehicles and space vehicles in addition to aerial vehicles. Further, the claims are not intended to be limited by any one example embodiment. For example, one or more of the operations of the methods 600 and 900 may be substituted for or combined with one or more operations of the methods 600 and 900, and vice versa.

The foregoing method descriptions and the process flow diagrams are provided merely as illustrative examples and are not intended to require or imply that the steps of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, two or more microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of controlling rotational maneuvers of a robotic vehicle, comprising:
   determining, by a processor of the robotic vehicle, a rotational maneuver to perform about an axis at a center of gravity of the robotic vehicle;
   determining, by the processor, an anticipated translational movement of a center of sensing of a sensor positioned away from the center of gravity of the robotic vehicle based on the rotational maneuver and a distance between the center of gravity of the robotic vehicle and the center of sensing; and
   controlling, by the processor, the robotic vehicle to perform a rotational maneuver such that the center of gravity of the robotic vehicle traverses a path that offsets for the movement of the center of sensing of the sensor.

2. The method of claim 1, wherein determining the anticipated translational movement of the center of sensing of the sensor comprises:
   determining, by the processor, one or more of an anticipated vertical movement and an anticipated horizontal movement of the center of sensing based on the rotational maneuver and the distance between the center of gravity of the robotic vehicle and the center of sensing.

3. The method of claim 2, wherein controlling the robotic vehicle to perform the rotational maneuver such that the center of gravity of the robotic vehicle traverses a path that offsets for the movement of the center of sensing of the sensor comprises:
   controlling, by the processor, the robotic vehicle to perform the rotational maneuver such that the center of gravity of the robotic vehicle traverses a path that offsets one or more of the anticipated vertical movement and the anticipated horizontal movement of the center of sensing.

4. The method of claim 1, wherein controlling the robotic vehicle to perform a rotational maneuver such that the robotic vehicle rotates about the center of sensing of the sensor comprises controlling, by the processor, a plurality of rotors to cause the robotic vehicle to perform the rotational maneuver about the axis at the center of sensing.

5. The method of claim 1, wherein the center of sensing comprises one or more of a location of the sensor, a sensing plane of the sensor, an image plane of a camera, and a focal plane of a camera.

6. The method of claim 1, wherein the rotational maneuver is one or more of a pitch, roll, or yaw.

7. The method of claim 1, wherein the robotic vehicle is one of an aerial vehicle, a terrestrial vehicle, a space-based vehicle, or an aquatic vehicle.

8. The method of claim 1, wherein determining the rotational maneuver to perform about the axis at the center of gravity of the robotic vehicle comprises:
   obtaining, by the processor, data defining a navigation path for the robotic vehicle; and
   determining, by the processor, the rotational maneuver to perform about the axis at the center of gravity of the robotic vehicle based on data defining the navigation path.

9. A computing device for a robotic vehicle, comprising:
   a processor configured with processor-executable instructions to:
      determine a rotational maneuver to perform about an axis at a center of gravity of the robotic vehicle;
      determine an anticipated translational movement of a center of sensing of a sensor positioned away from the center of gravity of the robotic vehicle based on the rotational maneuver and a distance between the center of gravity of the robotic vehicle and the center of sensing; and
      control the robotic vehicle to perform a rotational maneuver such that the center of gravity of the robotic vehicle traverses a path that offsets for the movement of the center of sensing of the sensor.

10. The computing device of claim 9, wherein the processor is further configured with processor-executable instructions to determine the anticipated translational movement of the center of sensing of the sensor by:
    determining one or more of an anticipated vertical movement and an anticipated horizontal movement of the center of sensing based on the rotational maneuver and the distance between the center of gravity of the robotic vehicle and the center of sensing.

11. The computing device of claim 10, wherein the processor is further configured with processor-executable instructions to control the robotic vehicle to perform the rotational maneuver such that the center of gravity of the robotic vehicle traverses a path that offsets for the movement of the center of sensing of the sensor by:
    controlling the robotic vehicle to perform the rotational maneuver such that the center of gravity of the robotic vehicle traverses a path that offsets one or more of the anticipated vertical movement and the anticipated horizontal movement of the center of sensing.

12. The computing device of claim 9, wherein the processor is further configured with processor-executable instructions to control the robotic vehicle to perform the rotational maneuver such that the center of gravity of the robotic vehicle traverses a path that offsets for the movement of the center of sensing of the sensor:
    controlling a plurality of rotors to cause the robotic vehicle to perform the rotational maneuver about the axis at the center of sensing.

13. The computing device of claim 9, wherein the center of sensing comprises one or more of a location of the sensor, a sensing plane of the sensor, an image plane of a camera, and a focal plane of a camera.

14. The computing device of claim 9, wherein the rotational maneuver is one or more of a pitch, roll, or yaw.

15. The computing device of claim 9, wherein the robotic vehicle is one of an aerial vehicle, a terrestrial vehicle, a space-based vehicle, or an aquatic vehicle.

16. The computing device of claim 9, wherein the processor is further configured with processor-executable instructions to determine the rotational maneuver to perform about the axis at the center of gravity of the robotic vehicle by:
    obtaining data defining a navigation path for the robotic vehicle; and
    determining the rotational maneuver to perform about the axis at the center of gravity of the robotic vehicle based on data defining the navigation path.

17. A processing device comprising:
    a processor configured with processor-executable instructions to:
       determine a rotational maneuver to perform about an axis at a center of gravity of a robotic vehicle;

determine an anticipated translational movement of a center of sensing of a sensor positioned away from the center of gravity of the robotic vehicle based on the rotational maneuver and a distance between the center of gravity of the robotic vehicle and the center of sensing; and control the robotic vehicle to perform a rotational maneuver such that the center of gravity of the robotic vehicle traverses a path that offsets for the movement of the center of sensing of the sensor.

18. The processing device of claim 17, wherein the stored processor-executable instructions are configured to cause the processor to determine the anticipated translational movement of the center of sensing of the sensor by:

determining one or more of an anticipated vertical movement and an anticipated horizontal movement of the center of sensing based on the rotational maneuver and the distance between the center of gravity of the robotic vehicle and the center of sensing.

19. The processing device of claim 18, wherein the stored processor-executable instructions are configured to cause the processor to control the robotic vehicle to perform the rotational maneuver such that the center of gravity of the robotic vehicle traverses a path that offsets for the movement of the center of sensing of the sensor by:

controlling the robotic vehicle to perform the rotational maneuver such that the center of gravity of the robotic vehicle traverses a path that offsets one or more of the anticipated vertical movement and the anticipated horizontal movement of the center of sensing.

20. The processing device of claim 17, wherein the stored processor-executable instructions are configured to cause the processor to control the robotic vehicle to perform a rotational maneuver such that the center of gravity of the robotic vehicle traverses a path that offsets for the movement of the center of sensing of the sensor by controlling a plurality of rotors to cause the robotic vehicle to perform the rotational maneuver about the axis at the center of sensing.

21. The processing device of claim 17, wherein the center of sensing comprises one or more of a location of the sensor, a sensing plane of the sensor, an image plane of a camera, and a focal plane of a camera.

22. The processing device of claim 17, wherein the rotational maneuver is one or more of a pitch, roll, or yaw.

23. The processing device of claim 17, wherein the robotic vehicle is one of an aerial vehicle, a terrestrial vehicle, a space-based vehicle, or an aquatic vehicle.

24. The processing device of claim 17, wherein the stored processor-executable instructions are configured to cause the processor to determine the rotational maneuver to perform about the axis at the center of gravity of the robotic vehicle by:

obtaining data defining a navigation path for the robotic vehicle; and determining the rotational maneuver to perform about the axis at the center of gravity of the robotic vehicle based on data defining the navigation path.

25. A computing device for a robotic vehicle, comprising:

means for determining a rotational maneuver to perform about an axis at a center of gravity of the robotic vehicle;

means for determining an anticipated translational movement of a center of sensing of a sensor positioned away from the center of gravity of the robotic vehicle based on the rotational maneuver and a distance between the center of gravity of the robotic vehicle and the center of sensing; and means for controlling the robotic vehicle to perform a rotational maneuver such that the center of gravity of the robotic vehicle traverses a path that offsets for the movement of the center of sensing of the sensor.

* * * * *